United States Patent
Arai (10) Patent No.: US 11,912,048 B2
(45) Date of Patent: Feb. 27, 2024

(54) PRINTER, CONTROL METHOD FOR PRINTER, AND NON-TRANSITORY COMPUTER-READABLE MEDIUM

(71) Applicant: SATO HOLDINGS KABUSHIKI KAISHA, Tokyo (JP)

(72) Inventor: Hidekazu Arai, Saitama (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 400 days.

(21) Appl. No.: 17/425,819

(22) PCT Filed: Jan. 20, 2020

(86) PCT No.: PCT/JP2020/001785
§ 371 (c)(1),
(2) Date: Jul. 26, 2021

(87) PCT Pub. No.: WO2020/195051
PCT Pub. Date: Oct. 1, 2020

(65) Prior Publication Data
US 2022/0161572 A1    May 26, 2022

(30) Foreign Application Priority Data
Mar. 25, 2019 (JP) ................................ 2019-057432

(51) Int. Cl.
*B41J 3/50* (2006.01)
*B41J 2/32* (2006.01)
*B41J 11/42* (2006.01)

(52) U.S. Cl.
CPC . *B41J 3/50* (2013.01); *B41J 2/32* (2013.01); *B41J 11/42* (2013.01)

(58) Field of Classification Search
CPC ................. B41J 3/50; B41J 2/32; B41J 11/42
See application file for complete search history.

(56) References Cited

FOREIGN PATENT DOCUMENTS

| EP | 2033793 A1 | * | 3/2009 | ............ B41J 3/4075 |
|---|---|---|---|---|
| JP | 2006-272844 A | | 10/2006 | |
| WO | WO-2006126481 A1 | * | 11/2006 | ............ B41J 29/393 |
| WO | WO-2019191588 A1 | * | 10/2019 | ............ B41J 3/4075 |

\* cited by examiner

*Primary Examiner* — Justin Seo
(74) *Attorney, Agent, or Firm* — Foley & Lardner LLP (57) ABSTRACT

The controller executes the first process once and then executes the second process. The first process is a process for back-feeding the continuous body, writing information to the RFID inlet, and then forward-feeding the continuous body until the RFID medium reaches the print start position. The second process is a process for stopping printing on the RFID medium halfway and writing information to the subsequent RFID medium following the RFID medium under printing when the RFID inlet of the subsequent RFID medium reaches the position allowing the communication with the antenna, and then resuming and completing printing on the RFID medium, printing on which was stopped halfway.

12 Claims, 6 Drawing Sheets

PRINTER, CONTROL METHOD FOR PRINTER, AND NON-TRANSITORY COMPUTER-READABLE MEDIUM

TECHNICAL FIELD

The present invention relates to a printer, a control method for the printer, and a program.

BACKGROUND ART

JP2006-272844A discloses a printer for printing on labels, each of the labels including an RFID (Radio Frequency Identification) inlet having an IC chip and an antenna.

In the above printer, the antenna for reading and writing information from and to the RFID inlet is located upstream of the printing unit. Therefore, depending on the label to be used, the RFID inlet of the label is positioned between the antenna and the printing unit in a state where the label continuous body is set in the printer and the label to be printed is set in the print position.

When such a label is used, the above printer repeatedly performs an operation in which the label continuous body is back-fed to write information to the RFID inlet of the label to be printed, and an operation in which the label to be printed is printed while forward-feeding the label continuous body.

SUMMARY OF INVENTION

In the above technique, each time one RFID medium such as one label is issued, back-feeding for writing information to the RFID inlet and forward-feeding for printing on the RFID medium are required. Therefore, the time required for feeding the continuous body increases, and it is difficult to increase the issuing speed of the RFID medium.

The present invention has been made in view of such a technical problem, and an object of the present invention is to increase the issuing speed of the RFID medium when the RFID medium, the RFID inlet of which is positioned between the antenna and the printing unit in a state where the RFID medium is set in the print start position, is used.

According to an aspect of the present invention, a printer is provided. The printer includes a printing unit configured to print on an RFID medium while feeding a continuous body on which RFID mediums are provided in series, each of the RFID mediums including an RFID inlet; an antenna provided upstream of the printing unit and configured to write information to the RFID inlet; first processing means for back-feeding the continuous body until the RFID inlet of the RFID medium in a print start position reaches a position allowing a communication with the antenna and writing information to the RFID inlet, and then forward-feeding the continuous body until the RFID medium, which was in the print start position, reaches the print start position; and second processing means for printing on the RFID medium while forward-feeding the continuous body, stopping printing on the RFID medium halfway and writing information to an RFID inlet of a subsequent RFID medium following the RFID medium under printing when the RFID inlet of the subsequent RFID medium reaches the position allowing the communication with the antenna, and then resuming and completing printing on the RFID medium, printing on which was stopped halfway. When a printing and issuing instruction of the RFID mediums is issued, processing of the first processing means is executed once, and then processing of the second processing means is executed.

According to the above aspect, as for the first RFID medium, information is written to the RFID inlet by back-feeding the continuous body. As for the second and subsequent RFID mediums, information is written to the RFID inlet when printing on the immediately preceding RFID medium is done halfway. Namely, as for the second and subsequent mediums, back-feeding for writing information to the RFID inlet is not required. Therefore, the time required for feeding the continuous body can be reduced, and the issuing speed of the RFID medium can be increased.

DESCRIPTION OF EMBODIMENTS

First Embodiment

Hereinafter, a first embodiment of the present invention will be described with reference to the accompanying drawings.

Figure 1:
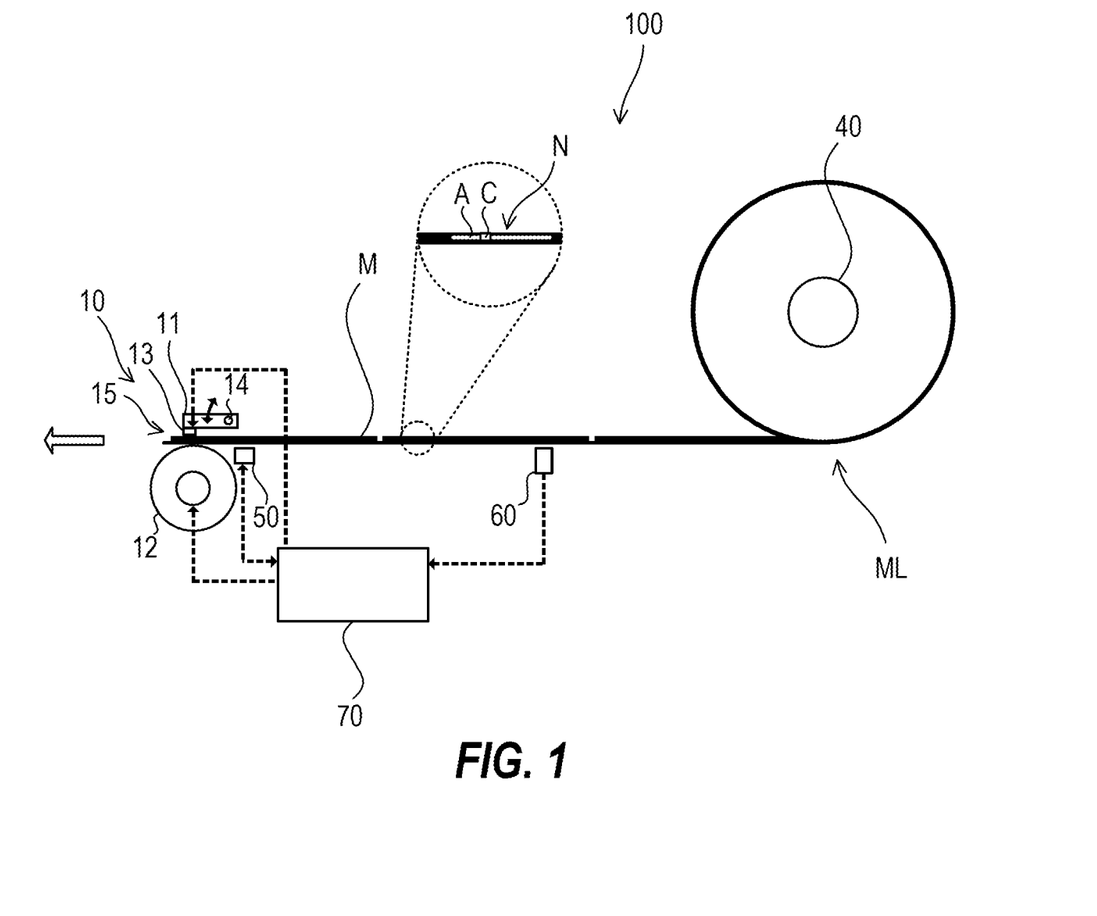
FIG. 1 is a schematic configuration diagram of a printer according to a first embodiment of the present invention.

FIG. 1 is a schematic configuration diagram of a printer 100 according to the first embodiment of the present invention.

The printer 100 is a printer for printing on an RFID medium (hereinafter referred to simply as "medium") M which includes an RFID inlet (hereinafter referred to simply as "inlet") N having an IC chip C and an antenna A. The printer 100 can also print on a printing medium which does not include the inlet N.

The printer 100 prints variable information such as prices, bar codes, other commodity information, control information about goods or services, and the like on the medium M based on a printing and issuing instruction of the medium M, and reads and writes information from and to the inlet N.

Note that "reading information from the inlet N" means reading information written to the IC chip C of the inlet N, and "writing information to the inlet N" means writing information to the IC chip C of the inlet N.

Examples of the medium M include tags, labels, wristbands, and the like.

In FIG. 1, the medium M is set in the printer 100. More specifically, in FIG. 1, the medium M is a label tentatively attached to a belt-shape liner sheet in series, and is set in the printer 100 as a continuous body ML of the medium M.

As shown in FIG. 1, the printer 100 includes a printing mechanism 10, a medium supply shaft 40, an antenna 50, a position detection sensor 60, and a controller (computer) 70.

The printing mechanism 10 includes a head unit 11 and a platen roller 12, and is a mechanism for feeding the continuous body ML and printing on the medium M.

The head unit 11 holds a thermal head 13, heating elements of which are exposed from a lower surface. The platen roller 12 is disposed just below the thermal head 13 and constitutes a printing unit 15 for printing on the medium M together with the thermal head 13.

The head unit 11 is pivotally supported by a supporting shaft 14 such that the head unit 11 can swing in a direction of a solid arrow in FIG. 1. The head unit 11 can be moved to a head open position in which the thermal head 13 is spaced from the platen roller 12 and to a head close position in which the thermal head 13 contacts the platen roller 12. In FIG. 1, the head unit 11 is in the head close position.

The medium supply shaft 40 holds the continuous body ML, which is supplied to the printing unit 15, in a roll shape. The continuous body ML supplied from the medium supply shaft 40 to the printing unit 15 is nipped between the thermal head 13 and the platen roller 12.

When the heating elements of the thermal head 13 are energized in a state where the medium M is nipped between the thermal head 13 and the platen roller 12, the medium M is colored by the heat of the heating elements to perform printing on the medium M. Further, when the platen roller 12 is rotated forward by a platen drive motor (not shown), the continuous body ML is fed downstream (in a direction of an outlined arrow). The feeding of the continuous body ML to the downstream side is referred to as "forward-feed", and the feeding of the continuous body ML to an upstream side is referred to as "back-feed".

The position detection sensor 60 is a reflection sensor that detects eye marks (not shown) printed beforehand at the same pitch as an arrangement pitch of the medium M on a surface of the belt-shape liner sheet opposing to a surface on which the medium M is arranged. This makes it possible to detect a relative position of the medium M relative to the printing unit 15 when the medium M is issued in series.

The controller 70 consists of a microprocessor, a memory device such as a ROM or a RAM, an input/output interface, a bus connecting these, and the like. The controller 70 may consist of a plurality of microcomputers. The printing and issuing instruction of the medium M from an external computer, a detection signal from the position detection sensor 60, and the like are input to the controller 70 via the input/output interface.

The controller 70 executes various control programs stored in the memory device by the microprocessor, and controls energization of the heating elements of the thermal head 13, energization of the platen drive motor, energization of the antenna 50 (reading and writing information from and to the inlet N), and the like. The various control programs executed by the controller 70 may be programs stored in a non-transient recording medium such as a CD-ROM, for example.

As described above, the printer 100 includes the antenna 50 upstream of the printing unit 15. Therefore, depending on the medium M to be used, the inlet N of the medium M may be positioned between the antenna 50 and the printing unit 15 in a state where the continuous body ML is set in the printer 100 and the medium M to be printed is set in the print start position (see state (a) in FIG. 2).

When such the medium M is used, the medium M can be issued in series by repeatedly performing an operation of writing information to the inlet N of the medium M to be printed by back-feeding the continuous body ML and an operation of printing information on the medium M to be printed while forward-feeding the continuous body ML.

However, in this case, the back-feeding and the forward-feeding need to be performed each time one medium M is issued. Therefore, the time required for feeding the continuous body ML increases, and it is difficult to increase the issuing speed of the medium M.

On the other hand, the printer 100 of the embodiment has a speed issuing mode in which the issuing speed of the medium M can be increased when the medium M, of which the inlet N is positioned between the antenna 50 and the printing unit 15 when the medium M is set to the print start position, is used.

Figure 2:
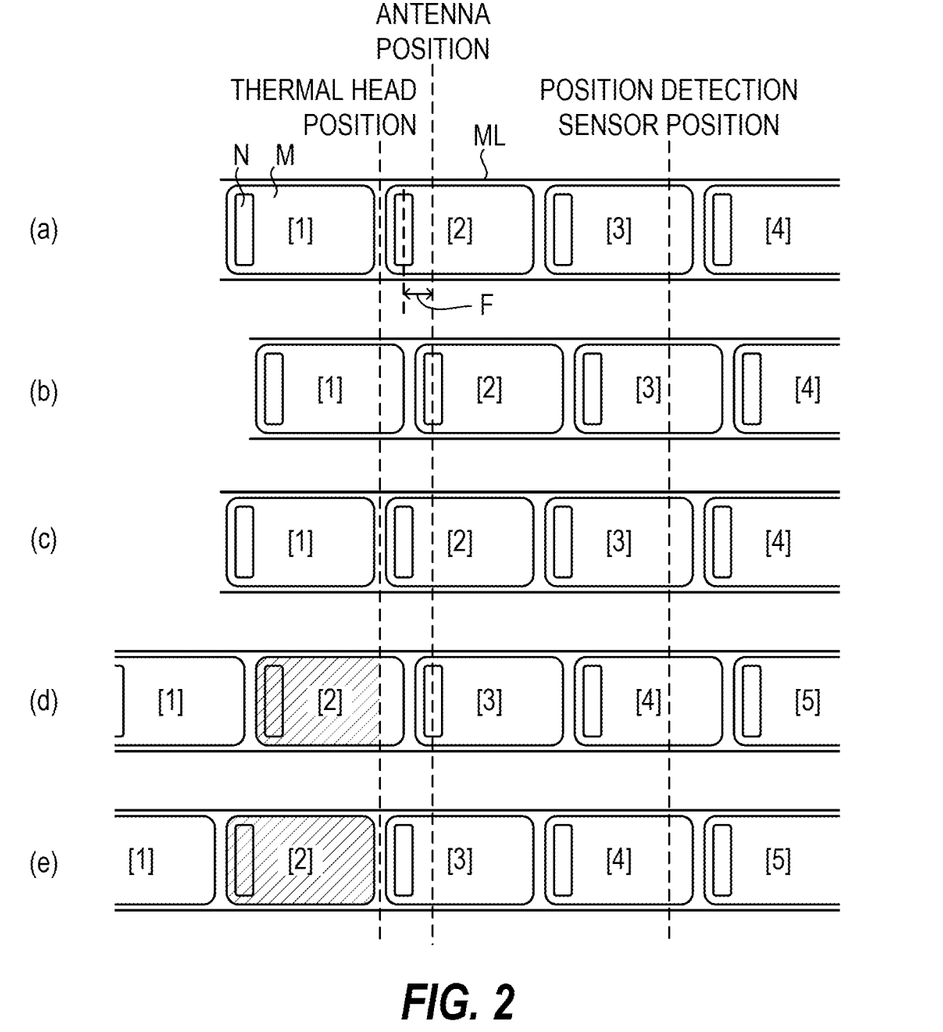
FIG. 2 is a diagram for explaining the operation of the printer.

Hereinafter, referring to FIG. 2, the operation of the printer 100 when the speed issuing mode is set will be described. In FIG. 2, serial numbers ([1], [2], . . . ) are assigned to each medium M in order to make it easy to understand the positional change of each medium M caused by the feeding of the continuous body ML.

As shown in the state (a) of FIG. 2, the continuous body ML is set in advance in the printer 100 in a state in which the medium M ([2]) to be printed first is in the print start position.

When the printing and issuing instruction is issued, the continuous body ML is back-fed until the inlet N of medium M ([2]) reaches a position allowing a communication with the antenna 50, and writing information to the inlet N is performed using the antenna 50 (state (a)→state (b)).

The back-feed amount at this time is an amount of an offset F between the inlet N and the antenna 50 in a state where the medium M is in the print start position (see the state (a)). The offset F is determined by the medium M to be used and can be set in the controller 70 of the printer 100 in advance.

After writing information to the inlet N, the continuous body ML is forward-fed until the medium M ([2]) reaches the print start position (state (b)→state (c)). The forward-feed amount at this time is the amount of the offset F which is the same with the above-described back-feed amount.

Next, printing is performed on the medium M ([2]) while forward-feeding the continuous body ML. When the inlet N of a subsequent medium M ([3]) reaches the position allowing the communication with the antenna 50, printing is stopped halfway. Then, information is written to the inlet N using the antenna 50 (state (c)→state (d)). The hatching on the medium M in the state (d) and the state (e) indicates a printed area.

The forward-feed amount from the state (c) to the state (d) is an amount obtained by subtracting the offset F from the arrangement pitch of the medium M on the belt-shape liner sheet. The arrangement pitch of the medium M is determined by the continuous body ML to be used, and the arrangement pitch can be set in the controller 70 of the printer 100 in advance.

After writing information to the inlet N, printing on the medium M ([2]) is resumed. When printing is completed, the subsequent medium M ([3]) reaches the print start position (state (d)→state (e)). The medium M ([3]) is aligned with the print start position based on the position of the eye mark detected by the position detection sensor 60.

Thereafter, the operation from the state (c) to the state (d) and the operation from the state (d) to the state (e) are repeatedly performed in accordance with the issuing number of the medium M.

Next, referring to the flow chart shown in FIG. 3, the content of a medium issuing process executed by the controller 70 when the printer 100 is set to the speed issuing mode will be described.

The continuous body ML is set in advance in the printer 100 such that the medium M to be printed first is in the print start position (see state (a) of FIG. 2). The controller 70 starts the medium issuing process when the printing and issuing instruction is issued.

The medium issuing process includes steps S11 to S13 as a first process and steps S15 to S17 as a second process. That is, the controller 70 has a function as a first processing means for executing the first process, and a function as a second processing means for executing the second process.

In step S11, the controller 70 back-feeds the continuous body ML until the inlet N of the medium M, which is an object to be printed first and is in the print start position, reaches the position allowing the communication with the antenna 50. The back-feed amount is the amount of the offset F set in advance.

In step S12, the controller 70 writes information to the inlet N of the medium M to be printed first using the antenna 50.

In step S13, the controller 70 forward-feeds the continuous body ML until the medium M to be printed first reaches the print start position. The forward-feed amount is the amount of the offset F which is the same as the back-feed amount in step S11.

In step S14, the controller 70 determines whether there is the subsequent medium M following the medium M to be printed.

Specifically, when the remaining issuing number is two or more, the controller 70 determines that there is the subsequent medium M following the medium M to be printed.

If the controller 70 determines that there is the subsequent medium M following the medium M to be printed, the controller 70 proceeds the process to step S15. If the controller 70 determines that there is no subsequent medium M following the medium M to be printed, the controller 70 proceeds the process to step S18.

In step S15, the controller 70 performs printing halfway on the medium M to be printed while feeding the continuous body ML. The position at which printing is stopped halfway is a position at which the continuous body ML is forward-fed by an amount obtained by subtracting the offset F from the arrangement pitch of the medium M on the belt-shape liner sheet.

As a result, printing is stopped halfway when the inlet N of the subsequent medium M following the medium M under printing is in the position allowing the communication with the antenna 50.

In step S16, the controller 70 writes information to the inlet N of the subsequent medium M following the medium M under printing using the antenna 50.

In step S17, the controller 70 resumes printing on the medium M under printing and completes printing. When printing is completed, the subsequent medium M is set in the print start position.

After completing the processing of step S17, the controller 70 repeats the processing from step S14. That is, the controller 70 executes the second process (steps S15 to S17) a number of times according to the issuing number of the medium M by executing the processing of step S14. In other words, the number of times according to the issuing number of the medium M is the number of times (n−1) which is smaller than the issuing number "n" of the medium M by "1".

In step S18, the controller 70 performs printing on the medium M to be printed. The medium M to be print in step S18 is the last medium M to be issued in accordance with the printing and issuing instruction.

As described above, the printer 100 of the present embodiment includes: the printing unit 15 configured to print on the medium M while feeding the continuous body ML on which the mediums M are provided in series, each of the mediums M including the inlet N; the antenna 50 provided upstream of the printing unit 15 and configured to write information to the inlet N; first processing means (controller 70) for back-feeding the continuous body ML until the inlet N of the medium M in the print start position reaches the position allowing the communication with the antenna 50 and writing information to the inlet N, and then forward-feeding the continuous body ML until the medium M, which was in the print start position, reaches the print start position; and second processing means (controller 70) for printing on the medium M while forward-feeding the continuous body ML, stopping printing on the medium M halfway and writing information to the inlet N of the subsequent medium M following the medium M under printing when the inlet N of the subsequent medium M reaches the position allowing the communication with the antenna 50, and then resuming and completing printing on the medium M, printing on which was stopped halfway. When the printing and issuing instruction of the mediums M is issued, processing of the first processing means (controller 70) is executed once, and then processing of the second processing means (controller 70) is executed.

The inlet N of the medium M is positioned between the printing unit 15 and the antenna 50 in a state where the medium M is in the print start position.

According to this, as for the first medium M, the continuous body ML is back-fed and the information is written to the inlet N. As for the second and subsequent mediums M, information is written to the inlet N in the middle of printing on the immediately preceding medium M. That is, as for the second and subsequent mediums M, back-feeding for writing information to the inlet N is not necessary. Therefore, the time required for feeding the continuous body ML can be reduced, and the issuing speed of the medium M can be increased.

Second Embodiment

Subsequently, a second embodiment of the present invention will be described with reference to the accompanying drawings.

Figure 4:
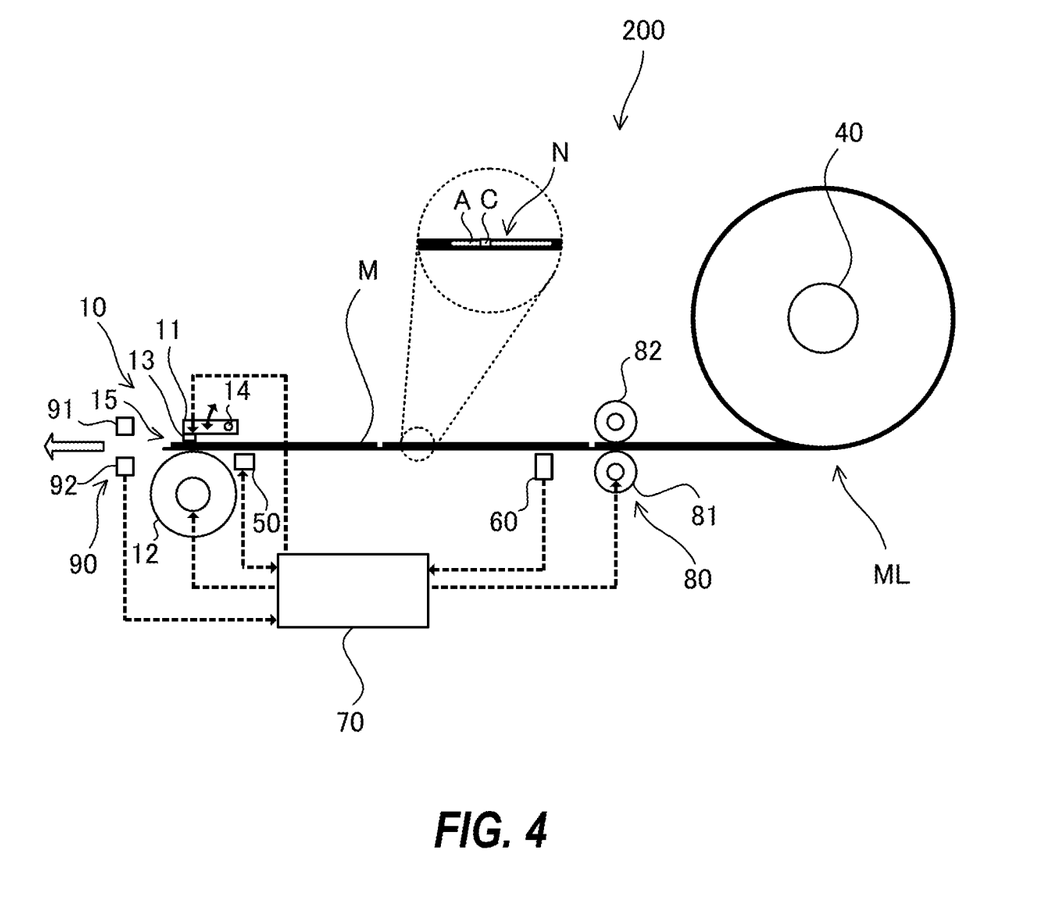
FIG. 4 is a schematic configuration diagram of a printer according to a second embodiment of the present invention.

FIG. 4 is a schematic configuration diagram of a printer 200 according to the second embodiment of the present invention. The configuration of the printer 200 differs from that of the printer 100 in that the printer 200 includes an upstream side feeding unit 80 which is provided upstream of the printing unit 15 and feeds the continuous body ML, and a continuous body detection sensor 90 which is provided downstream of the printing unit 15 and detects the continuous body ML. Hereinafter, differences from the printer 100 will be mainly described, and the same components as those of the printer 100 will be denoted by the same reference numerals, and descriptions thereof will be omitted.

The upstream side feeding unit 80 includes a drive roller 81 and a driven roller 82. The upstream side feeding unit 80 nips the continuous body ML supplied from the medium supply shaft 40 to the printing unit 15 between the drive roller 81 and the driven roller 82.

When the drive roller 81 is rotated forward by a roller drive motor (not shown), the continuous body ML is fed downstream (in a direction of an outlined arrow).

The roller drive motor is controlled by the controller 70, similar to the platen drive motor. The drive roller 81 may be driven by transmitting the driving force of the platen drive motor by a belt or the like without providing the roller drive motor.

The continuous body detection sensor 90 is a transmission sensor having a light emitting unit 91 for emitting a predetermined light, and a light receiving unit 92 for receiving light emitted from the light emitting unit 91 and outputting a detection signal corresponding to the intensity of the received light. The detection signal of the continuous body detection sensor 90 is input to the controller 70 via the input/output interface.

The intensity of the light received by the light receiving unit 92 differs between a state where nothing exists between the light emitting unit 91 and the light receiving unit 92, a state where only the band-shape liner sheet exists, and a state where the medium M exists.

Therefore, when the state is shifted among the state where nothing exists between the light emitting unit 91 and the light receiving unit 92, the state where only the band-shape liner sheet exists, and the state where the medium M exists, by feeding the continuous body ML, the strength of the light received by the light receiving unit 92 changes in accordance with the respective states. Thus, the continuous body detection sensor 90 can detect a leading edge position of the medium M. The continuous body detection sensor 90 may be a reflective sensor.

By providing the continuous body detection sensor 90, the printer 200 can perform an aligning process for aligning the medium M provided at a leading part of the continuous body ML with the print start position.

Figure 5:
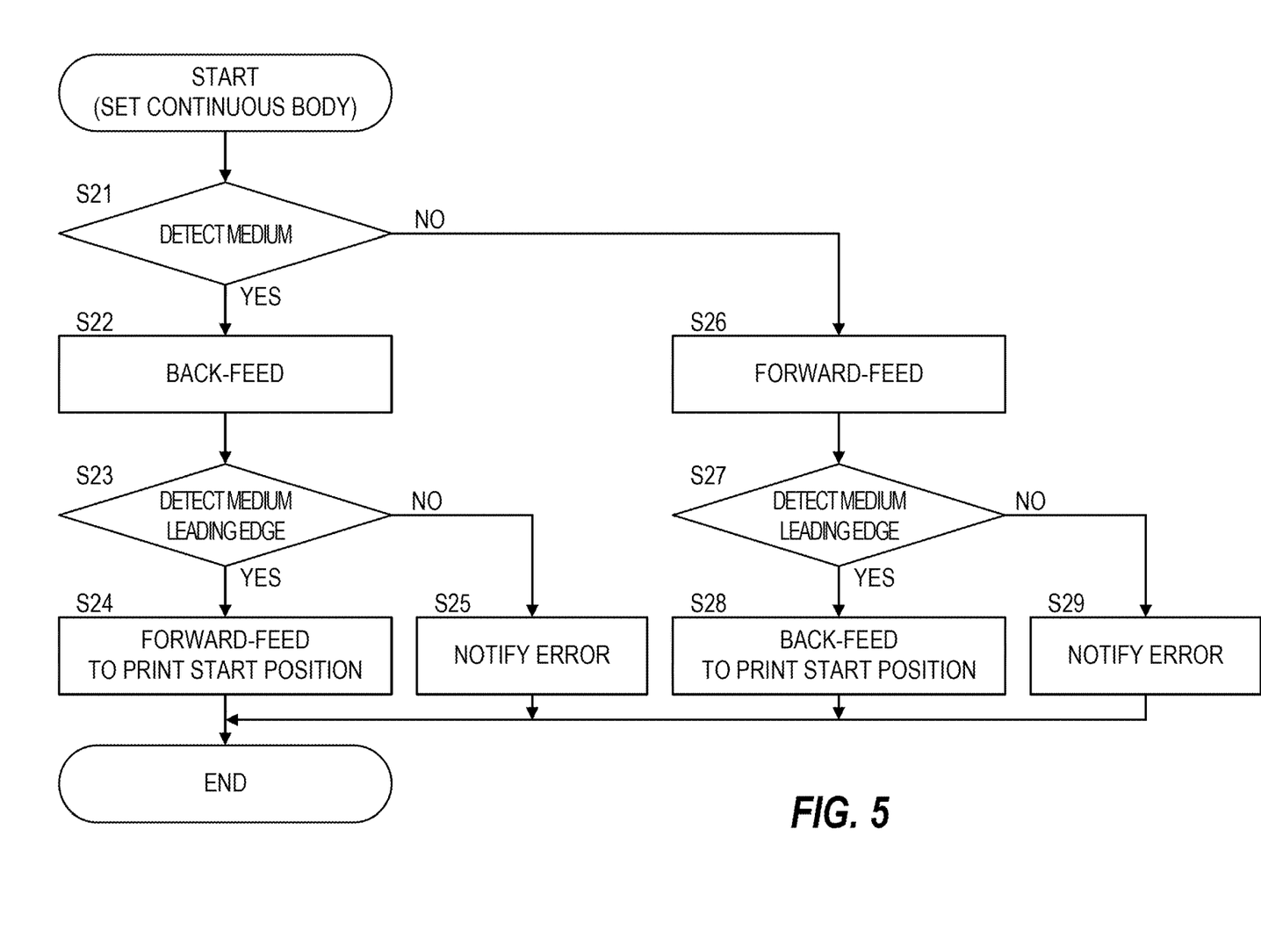
FIG. 5 is a flowchart showing a content of an aligning process.

Hereinafter, referring to the flow chart shown in FIG. 5, the content of the aligning process as a third process executed by the controller 70 will be described. That is, the controller 70 has a function as a third processing unit for executing the third process. It can be set in advance as to whether or not the aligning process is performed.

The controller 70 starts the aligning process when the continuous body ML is set in the printer 200.

In step S21, the controller 70 determines whether or not the medium M has been detected based on the detection signal from the continuous body detection sensor 90.

If the medium M has been detected, the controller 70 proceeds the process to step S22. If no medium M has been detected, controller 70 proceeds the process to step S26.

In step S22, the controller 70 backs-feeds the continuous body ML.

In step S23, the controller 70 determines whether or not the leading edge position of the medium M has been detected in association with the back-feeding of the continuous body ML.

If the leading edge position of the medium M has been detected, the controller 70 proceeds the process to step S24. If the leading edge position of the medium M has not been detected even if the back-feeding is performed to a predetermined extent, the controller 70 proceeds the process to step S25.

In step S24, the controller 70 forward-feeds the continuous body ML until the medium M, the leading edge position of which has been detected, reaches the print start position. Since the distance between the continuous body detection sensor 90 and the printing unit 15 is defined, it is possible to determine the forward-feed amount which causes the medium M, the leading edge position of which has been detected, to reach the print start position.

In step S25, the controller 70 notifies errors. Specifically, for example, a process of displaying error information on a display (not shown) of the printer 200, a process of generating a warning sound, or the like is executed.

In step S26, the controller 70 forward-feeds the continuous body ML.

In step S27, the controller 70 determines whether or not the leading edge position of the medium M has been detected in association with the forward-feeding of the continuous body ML.

If the leading edge position of the medium M has been detected, the controller 70 proceeds process to step S28. If the leading edge position of the medium M has not been detected even if the forward-feeding is performed to a predetermined extent, the controller 70 proceeds the process to step S29.

In step S28, the controller 70 backs-feeds the continuous body ML until the medium M, the leading edge position of which has been detected, reaches the print start position. As described above, since the distances between the continuous body detection sensor 90 and the printing unit 15 are defined, it is possible to determine the back-feed amount which causes the medium M, the leading edge position of which has been detected, to reach the print start position.

The processing of step S29 is the same as the processing of step S25.

As described above, in the printer 200, the medium M provided at the leading part of the continuous body ML can be aligned with the print start position.

Further, in the printer 200, when the aligning processing is executed, the content of the medium issuing process in the speed issuing mode differs in part from that of the printer 100.

Figure 6:
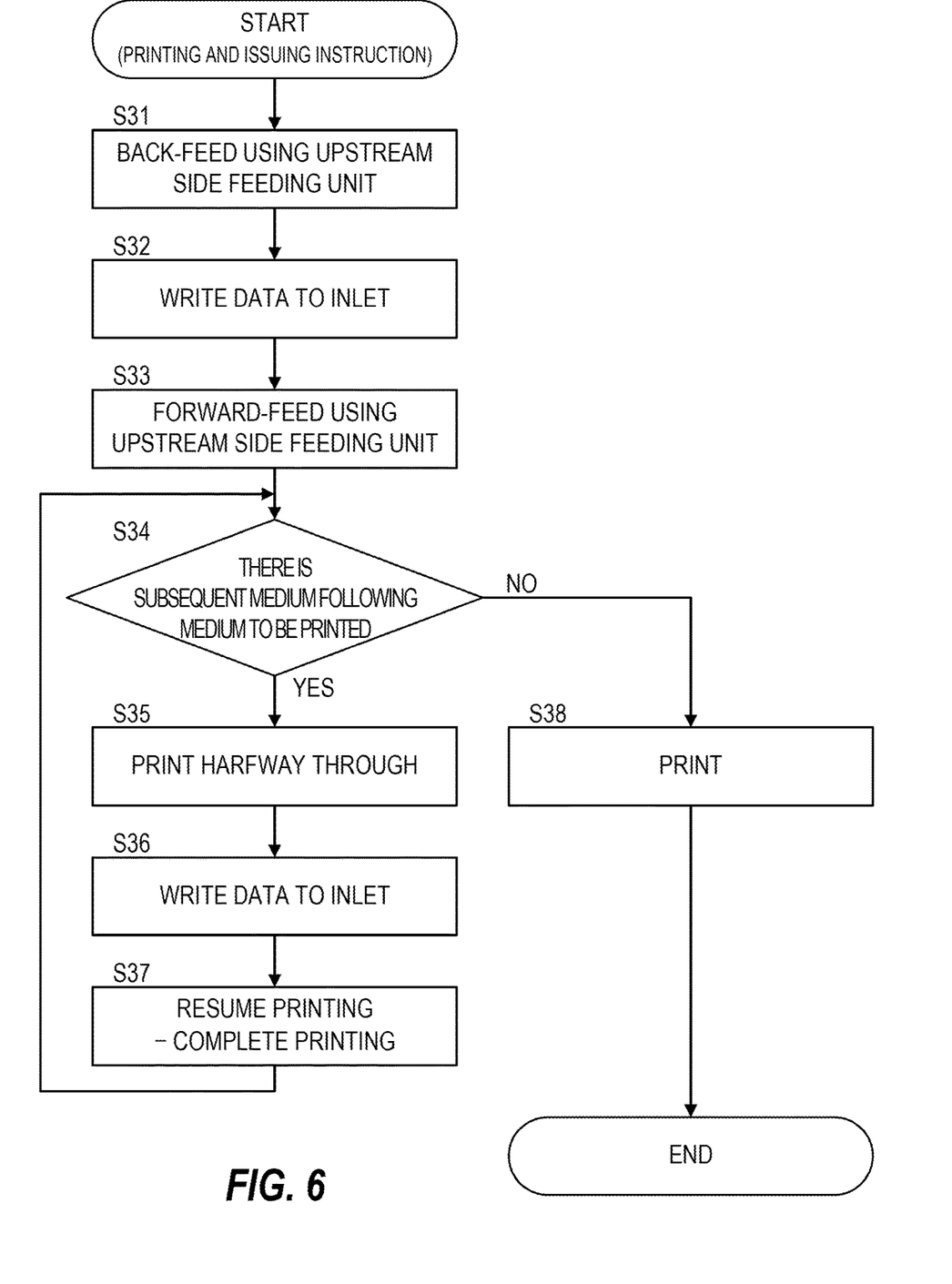
FIG. 6 is a flow chart showing a content of a medium issuing process according to the second embodiment.

Hereinafter, referring to the flow chart shown in FIG. 6, the content of medium issuing process executed by the controller 70 of the printer 200 when the positioning process is executed will be described.

The controller 70 starts the medium issuing process when the printing and issuing instruction is issued.

The medium issuing process includes steps S31 to S33 as the first process and steps S35 to S37 as the second process. That is, the controller 70 has the function as the first processing unit for executing the first process, the function as the second processing unit for executing the second process.

In step S31, the controller 70 back-feeds the continuous body ML using the upstream side feeding unit 80 until the inlet N of the medium M, which is an object to be printed first and in the print start position, reaches the position allowing the communication with the antenna 50. The back-feed amount is the amount of the offset F set in advance.

When the aligning process is executed, the continuous body ML cannot be fed by the printing unit 15 because the leading edge position of the continuous body ML moves to a position upstream of the printing unit 15 in association with the back-feeding. Therefore, in the printer 200, the continuous body ML is back-fed using the upstream side feeding unit 80.

In step S32, the controller 70 writes information to the inlet N of the medium M which is the object to be printed first using the antenna 50.

In step S33, the controller 70 forward-feeds the continuous body ML using the upstream side feeding unit 80 until the medium M, which is the object to be printed first, reaches the print start position. The forward-feed amount is the amount of the offset F which is the same as the back-feed amount in step S11.

Figure 3:
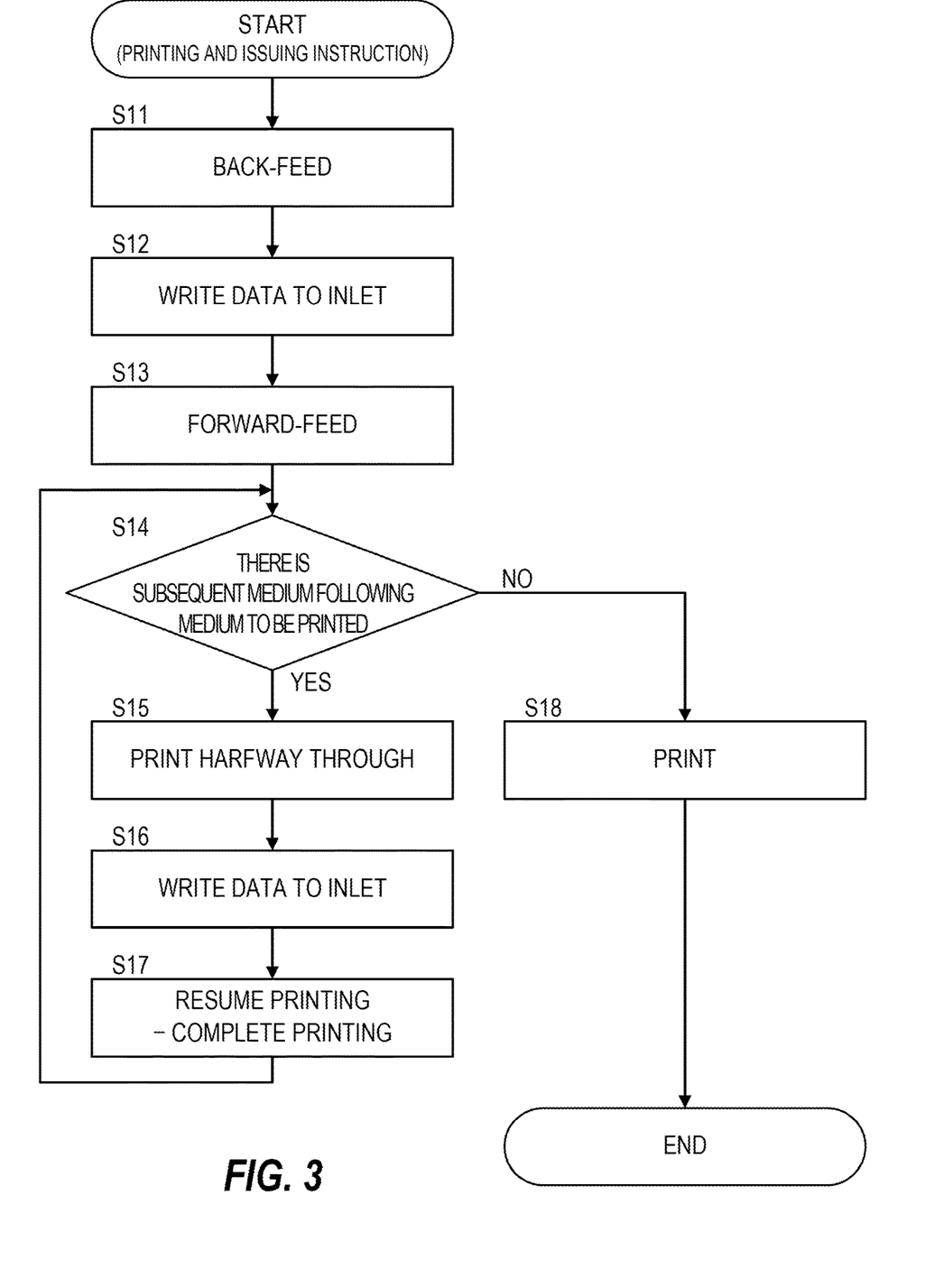
FIG. 3 is a flow chart showing a content of a medium issuing process according to the first embodiment.

The processing after step S34 is the same as the processing after step S14 of the medium issuing process in the first embodiment (see FIG. 3).

In the printer 200, when the continuous body ML is fed, the upstream side feeding unit 80 and the printing unit 15 perform the feeding operation in synchronization to prevent the medium from being rubbed by the printing unit 15 or the upstream side feeding unit 80 and getting dirty. Therefore, in the medium issuing process shown in FIG. 6 as well, the controller 70 appropriately synchronizes the feeding operation of the upstream side feeding unit 80 and the printing unit 15.

As described above, the printer 200 of the present embodiment includes: the upstream side feeding unit 80 provided upstream of the printing unit 15 and configured to feed the continuous body ML; the continuous body detection sensor 90 provided downstream of the printing unit 15 and configured to detect the continuous body ML; and third processing means (controller 70) for aligning the medium M provided at the leading part of the continuous body ML with the print start position based on the detection state of the continuous body detection sensor 90, when the continuous body ML is set in the printer 200. When processing of the third processing means (controller 70) is executed, the back-feeding and the forward-feeding by the first processing means (controller 70) are performed by the upstream side feeding unit 80.

According to this, it is possible to perform printing on the medium M provided at the leading part of the continuous body ML and writing of information to the inlet N of the same medium M. Therefore, the medium M provided at the leading part of the continuous body ML can be issued without being wasted.

The embodiment of the present invention is described above. However, the above embodiment does not intend to limit the technical scope of the present invention to the specific configuration of the above embodiment but only shows one of application examples of the present invention.

The present application claims a priority of Japanese Patent Application No. 2019-057432 filed with the Japan Patent Office on Mar. 25, 2019, all the contents of which are hereby incorporated by reference.

The invention claimed is:

1. A printer comprising:
a printing unit configured to print on an RFID medium while feeding a continuous body on which RFID mediums are provided in series, each of the RFID mediums including an RFID inlet;
an antenna provided upstream of the printing unit and configured to write information to the RFID inlet;
first processing means for back-feeding the continuous body until the RFID inlet of the RFID medium in a print start position reaches a position allowing a communication with the antenna and writing information to the RFID inlet, and then forward-feeding the continuous body until the RFID medium, which was in the print start position, again reaches the print start position; and
second processing means for printing on the RFID medium while forward-feeding the continuous body, stopping printing on the RFID medium halfway and writing information to an RFID inlet of a subsequent RFID medium following the RFID medium under printing when the RFID inlet of the subsequent RFID medium reaches the position allowing the communication with the antenna, and then resuming and completing printing on the RFID medium, printing on which was stopped halfway; wherein
when a printing and issuing instruction of the RFID mediums is issued, processing of the first processing means is executed once, and then processing of the second processing means is executed.

2. A printer comprising:
a printing unit configured to print on an RFID medium while feeding a continuous body on which RFID mediums are provided in series, each of the RFID mediums including an RFID inlet;
an antenna provided upstream of the printing unit and configured to write information to the RFID inlet;
an upstream side feeding unit provided upstream of the printing unit and configured to feed the continuous body;
a continuous body detection sensor provided downstream of the printing unit and configured to detect the continuous body;
first processing means for back-feeding the continuous body until the RFID inlet of the RFID medium in a print start position reaches a position allowing a communication with the antenna and writing information to the RFID inlet, and then forward-feeding the continuous body until the RFID medium, which was in the print start position, again reaches the print start position;
second processing means for printing on the RFID medium while forward-feeding the continuous body, stopping printing on the RFID medium halfway and writing information to an RFID inlet of a subsequent RFID medium following the RFID medium under printing when the RFID inlet of the subsequent RFID medium reaches the position allowing the communication with the antenna, and then resuming and completing printing on the RFID medium, printing on which was stopped halfway; and
third processing means for aligning the RFID medium provided at a leading part of the continuous body with the print start position based on a detection state of the continuous body detection sensor, when the continuous body is set in the printer; wherein
when a printing and issuing instruction of the RFID mediums is issued, processing of the first processing means is executed once, and then processing of the second processing means is executed, and when processing of the third processing means is executed, the back-feeding and the forward-feeding by the first processing means are performed using the upstream side feeding unit.

3. The printer as defined in claim 1
the RFID inlet of the RFID medium is positioned between the printing unit and the antenna in a state where the RFID medium is in the print start position.

4. The printer as defined in claim 2
the RFID inlet of the RFID medium is positioned between the printing unit and the antenna in a state where the RFID medium is in the print start position.

5. A control method for a printer including
a printing unit configured to print on an RFID medium while feeding a continuous body on which RFID mediums are provided in series, each of the RFID mediums including an RFID inlet; and
an antenna provided upstream of the printing unit and configured to write information to the RFID inlet; the control method comprising:
executing a first processing once when a printing and issuing instruction of the RFID mediums is issued, the first processing being a processing for back-feeding the continuous body until the RFID inlet of the RFID medium in a print start position reaches a position allowing a communication with the antenna and writing information to the RFID inlet, and then forward- feeding the continuous body until the RFID medium, which was in the print start position, again reaches the print start position; and executing a second processing after executing the first processing, the second processing being a processing for printing on the RFID medium while forward-feeding the continuous body, stopping printing on the RFID medium halfway and writing information to an RFID inlet of a subsequent RFID medium following the RFID medium under printing when the RFID inlet of the subsequent RFID medium reaches the position allowing the communication with the antenna, and then resuming and completing printing on the RFID medium, printing on which was stopped halfway.

6. The control method for the printer as defined in claim 5, wherein the printer includes an upstream side feeding unit provided upstream of the printing unit and configured to feed the continuous body; and a continuous body detection sensor provided downstream of the printing unit and configured to detect the continuous body;

the control method comprises executing a third processing when the continuous body is set in the printer, the third processing being a processing for aligning the RFID medium provided at a leading part of the continuous body with the print start position based on a detection state of the continuous body detection sensor; wherein the back-feeding and the forward-feeding in the first processing are performed using the upstream side feeding unit.

7. The control method for the printer as defined in claim 5, wherein the RFID inlet of the RFID medium is positioned between the printing unit and the antenna in a state where the RFID medium is in the print start position.

8. The control method for the printer as defined in claim 6, wherein the RFID inlet of the RFID medium is positioned between the printing unit and the antenna in a state where the RFID medium is in the print start position.

9. A non-transitory computer-readable medium storing a program executable by a computer of a printer including a printing unit configured to print on an RFID medium while feeding a continuous body on which RFID mediums are provided in series, each of the RFID mediums including an RFID inlet; and an antenna provided upstream of the printing unit and configured to write information to the RFID inlet; wherein the program causes the computer to execute:

a procedure to perform a first processing once when a printing and issuing instruction of the RFID mediums is issued, the first processing being a processing for back-feeding the continuous body until the RFID inlet of the RFID medium in a print start position reaches a position allowing a communication with the antenna and writing information to the RFID inlet, and then forward-feeding the continuous body until the RFID medium, which was in the print start position, reaches the print start position; and a procedure to perform a second processing after executing the first processing, the second processing being a processing for printing on the RFID medium while forward-feeding the continuous body, stopping printing on the RFID medium halfway and writing information to an RFID inlet of a subsequent RFID medium following the RFID medium under printing when the RFID inlet of the subsequent RFID medium reaches the position allowing the communication with the antenna, and then resuming and completing printing on the RFID medium, printing on which was stopped halfway.

10. The non-transitory computer-readable medium as defined in claim 9, wherein the printer includes:

an upstream side feeding unit provided upstream of the printing unit and configured to feed the continuous body; and a continuous body detection sensor provided downstream of the printing unit and configured to detect the continuous body;

the program causes the computer to execute a procedure for performing a third processing when the continuous body is set in the printer, the third processing being a processing for aligning the RFID medium provided at a leading part of the continuous body with the print start position based on a detection state of the continuous body detection sensor; and a procedure for performing the back-feeding and the forward-feeding in the first processing using the upstream side feeding unit.

11. The non-transitory computer-readable medium as defined in claim 9, wherein the RFID inlet of the RFID medium is positioned between the printing unit and the antenna in a state where the RFID medium is in the print start position.

12. The non-transitory computer-readable medium as defined in claim 10, wherein the RFID inlet of the RFID medium is positioned between the printing unit and the antenna in a state where the RFID medium is in the print start position.

* * * * *